United States Patent [19]

Eastes

[11] 4,020,228

[45] Apr. 26, 1977

[54] GEL COMPOSITION, HEAT SEALABLE SUBSTRATES, AND PROCESS FOR HEAT SEALING

[75] Inventor: Frank E. Eastes, Spartanburg, S.C.

[73] Assignee: W. R. Grace & Co., Duncan, S.C.

[22] Filed: Nov. 11, 1974

[21] Appl. No.: 522,544

[52] U.S. Cl. .......................... 428/347; 260/23 R; 260/23 H; 260/23.3; 428/349; 428/500; 428/510; 428/514; 428/516; 428/518; 428/520; 428/522; 428/532; 428/537

[51] Int. Cl.$^2$ .................. C09J 7/02; B32B 27/32

[58] Field of Search .......... 428/522, 520, 514, 510, 428/532, 537, 516, 518, 347, 349, 500; 260/23 R, 23 H, 23.3

[56] References Cited

UNITED STATES PATENTS

| | | | |
|---|---|---|---|
| 2,492,760 | 12/1949 | Murphy | 428/514 |
| 2,543,229 | 2/1951 | Chapman | 428/510 |
| 3,158,520 | 11/1964 | Edmonds | 156/307 |
| 3,201,302 | 8/1965 | Williams | 428/516 |
| 3,245,931 | 4/1966 | Mathew | 260/28.5 |
| 3,417,040 | 12/1968 | Kremer | 260/23 R |
| 3,522,081 | 7/1970 | Moyer | 428/514 |
| 3,524,795 | 8/1970 | Peterson | 428/520 |
| 3,642,676 | 2/1972 | Saunders | 260/23 R |

OTHER PUBLICATIONS

"Materials and Compounding Ingredients for Rubber and Plastics", p. 383, 1965, New York, N.Y.

Primary Examiner—Ellis P. Robinson
Attorney, Agent, or Firm—John J. Toney; William D. Lee, Jr.; John B. Hardaway

[57] ABSTRACT

The invention disclosed is directed to a gel composition, including (a) an aliphatic saturated monocarboxylic acid having from about 10 to about 24 carbon atoms; (b) an interpolymer of ethylene and a vinyl ester of a monocarboxylic acid having from 1 to about 4 carbon atoms; (c) a tackifying resin; and (d) an organic solvent. Substrate surfaces to which the gel composition is applied typically exhibit good resistance to blocking and may be effectively heat sealed to other surfaces at relatively low temperatures in minimum time. In aspects of the invention the coated substrates may be polyolefinic or cellulosic sheet materials, including laminates thereof with vinylidene chloride interpolymer layers. Improved heat sealable substrates and processes for heat sealing are also described.

16 Claims, No Drawings

GEL COMPOSITION, HEAT SEALABLE SUBSTRATES, AND PROCESS FOR HEAT SEALING

This invention relates to an improved gel composition, to a heat sealable substrate coated with a substantially dry residue of the gel composition, and to a process for heat sealing.

Heat seal adhesives include a class of dry film forming adhesives which exhibit little or no tackiness at ambient temperatures. Such adhesives require the application of heat to permit their being adhesively bonded to substrates. The temperature at which such adhesives exhibit tack is known as the activation temperature, which depends upon the composition of the adhesive. Although heat seal adhesives find use in the packaging industry, their utilization is often limited due to undesirable properties including their tendency to block and the excessively high temperature required for their activation.

To be commercially acceptable heat seal adhesives desirably have a number of important properties. Thus, films of the adhesive should be substantially non-tacky at temperatures up to about 110° F. Substrates having the adhesives coated thereon should effectively resist blocking to adjacent surfaces. In addition, the activation temperature of these adhesives should not be excessively high. Films derived from these adhesives preferably are capable of forming strong, durable bonds with a wide variety of substrates such as, for example, glass; wood; metal; metallic foils; and polymeric sheet materials formed from polymers of olefins, cellulose, and other monomers.

It is known in the art that ethylene/vinyl acetate copolymers may be blended with petroleum wax to improve the flexibility, adhesiveness, heat-sealability, hardness, gloss, and blocking temperature of the wax. Ethylene/vinyl acetate copolymer petroleum wax blends find use in coating flexible cellulosic sheet materials, such as paper, paperboard, glassine and cellophane. Flexible cellulosic sheet materials thus coated have heretofore been formed into containers with overlapping surfaces by heat sealing the overlapping surfaces together.

However most ethylene/vinyl acetate copolymer-petroleum wax compositions have not been entirely satisfactory in regard to hot tack properties and adhesive strength when they are hot. Many ethylene/vinyl acetate copolymer-petroleum wax blends are generally unsuitable for use as heat-sealable coatings where the heat-sealed bonds are subjected to any substantial parting forces while the bonds are still hot.

Consequently, ethylene/vinyl acetate copolymer-petroleum wax blends have not been entirely satisfactory as heat-sealable coatings on flexible cellulosic sheet materials when processed by "form and fill" processes, described, for example, in U.S. Pat. Nos. 3,027,695 and 3,027,696 to Leasure. In these processes packages are prepared, filled and sealed by forming a sheet material into a tubular shape with overlapping sheet margins as a side seam, heat sealing the bottom edge of the tube, and thereafter simultaneously heat-sealing the side seam of the package and filling it with the desired products, followed by heat-sealing the top edge of the package. These processes are used to package a variety of different products including bakery goods, potato chips, cereals, hardware, electronic components, toys and kits.

Machines used in form and fill processes operate at very high speeds, forming and filling from 30 to 300 or more units per minute. Since the heat-sealed bonds formed at these high speeds are subjected to considerable parting forces while still hot, it is imperative that the flexible sheet material be coated with a heat-sealable composition which possesses sufficient hot tack and flow out properties to form a heat-sealed bond which will not separate during the forming and filling operation.

Other flexible sheet materials which have not been entirely satisfactorily heat sealed in form and fill processes include polyolefinic sheet materials such as polyethylene film and polypropylene film, saran coated polyolefin films such as saran coated polyethylene, and saran coated cellulosic sheets or films such as saran coated glassine film. Saran coated polyolefin films have heretofore been of limited utility in higher speed packaging processes involving heat sealing. As a practical matter, these saran coated films have required high heat sealing temperatures, e.g., 300° F, with minimum permissible temperature deviation, e.g., plus or minus 10° F.

U.S. Pat. No. 3,245,931 to Matthew discloses a process for heat sealing cellulosic sheet materials, which may be glassine, wherein a particular composition of wax, ethylene/vinyl acetate copolymer, and $\alpha$-methylstyrene/vinyl toluene copolymer is employed as a sealing aid. U.S. Pat. No. 3,558,399 to Turner discloses a process for heat sealing saran coated polyolefin which includes applying thereto a coating composition, broadly disclosed but exemplified throughout as including at least a wax, a polymer of ethylene vinyl acetate and/or ethylene vinyl acrylate, and terpene resin. According to the description, the coatings will provide heat sealing ranges of 175° F to 325° F and may be applied as a hot melt, solution or dispersion.

U.S. Pat. No. 3,503,909 to Bowman et al discloses a lacquer including nitrocellulose, ethylene/vinyl acetate copolymer, sucrose acetate isobutyrate and an organic solvent, which, according to the description, yields tough, hard coatings.

U.S. Pat. No. 3,201,302 to Williams et al generally discloses a process for heat sealing polyolefins prepared from $\alpha$-olefins having from 2–10 carbon atoms by wetting the polyolefin surface with a thin coating of organic liquids selected from specified aromatic compounds, halogenated paraffins and olefins; contacting the wetted surface with another surface; and heating the surfaces to temperatures from 20° to 30° F below the tack temperature.

U.S. Pat. No. 3,158,520 to Edmonds et al discloses that stearic acid, per se, when coated onto films of high density polyethylene or other $C_2$ to $C_6$ 1-olefins, aids heat sealing thereof. According to their description the process involves heating the film to a molten condition, that is, normally above 300° F.

Other heretofore reported deficiencies of stearic acid as an aid for heat sealing are shown in U.S. Pat. No. 3,393,081 to Bogle, wherein it is disclosed broadly that aliphatic saturated monocarboxylic acids having from 10 to 22 carbon atoms improve the moisture barrier properties and heat seal characteristics of polystyrene. Although acids having an even number of carbon atoms in the range between 16 and 20 are generally disclosed to be "particularly effective," stearic acid effects a merely "fair" heat seal according to Example I thereof (see Sample No. 10, Tables I and IA). The unsatisfactory performance of stearic acid per se in attempts to make good heat seals is not surprising, especially in light of the long known employment of stearic acid as an antiblock coating for sheet materials or films to reduce their tendency to adhere to other film surfaces (see, for example, Slack et al, U.S. Pat. No. 2,011,348 which issued in 1935).

U.S. Pat. No. 3,463,751 to Hasegawa et al discloses a dry powdery nonblocking composition for dry blending with vinyl chloride resin, including (a) an anti-sticking agent which may be stearic acid, (b) polyvinyl chloride, and (c) a finely divided and nondried copolymer of ethylene and a vinyl ester which may be vinyl acetate. According to the specification, it is essential to use the polyvinyl chloride powder together with the antisticking agent.

It has now been found that a highly effective stearic acid containing gel composition can be prepared. The gel composition aids in heat sealing a variety of substrates at low temperatures. For example, polyolefin films may thus be effectively heat sealed to other surfaces without need for heating the film to a molten condition. A major advantage of the present invention is that strong heat seals between surfaces of saran, that is interpolymers containing about 80 or more percent by weight of vinylidene chloride, and surfaces of cellulosic materials or polyolefins may be prepared at lower cost without requiring excessive activation temperatures. Moreover, substrates having dried coatings of the gel composition are typically characterized with good resistance to blocking. Heat sealing of saran to commercially important packaging materials, including films of polyethylene, polypropylene, and glassine may thus be effected in simple, efficient, and economical manner.

Generally stated, in one aspect the present invention provides a gel composition including:
a. an aliphatic saturated monocarboxylic acid having from about 10 to about 24 carbon atoms;
b. an interpolymer of ethylene and a vinyl ester of a monocarboxylic acid having from 1 to about 4 carbon atoms;
c. a tackifying resin; and
d. an organic solvent.

In another aspect of the present invention, there is provided a heat sealable article comprising a solid substrate having coated thereon a substantially dry residue of the present gel composition.

In still another aspect, this invention provides a process for heat sealing two surfaces which includes applying the present gel composition to a surface, removing an effective amount of the organic solvent from the applied gel composition to form a substantially dry gel coating, and heat sealing a second surface to the surface of the gel coating.

Practice of the present invention will become more apparent from the following detailed description.

The monocarboxylic acid component of the present gel composition may be an aliphatic saturated monocarboxylic acid having from about 10 to about 24 carbon atoms. The acids having 16 to 20 and preferably 16, 18 or 20 carbon atoms are preferred. Especially effective seals may be prepared from embodiment gel compositions wherein the acid is stearic acid. Surprisingly, good seals have been formed with minimum seal pressure and dwell time at temperatures of 130° F and lower, using gel compositions wherein stearic acid is the acid component. This is particularly surprising in that the melting point of stearic acid is about 156° F. The acid component may be included in any amount effective for aid in heat sealing. In general, the acid component may be included in an amount from about 5 to about 40 parts by weight per 100 parts by total weight of the acid component, the ethylene/ vinyl ester interpolymer component, and the tackifying resin component, and preferably from about 10 to about 30 parts by weight on the same basis.

The vinyl ester moiety of the interpolymerized ethylene/ vinyl ester component is a vinyl ester of a monocarboxylic acid having from 1 to about 4 carbon atoms per molecule, e.g. vinyl formate, vinyl acetate, vinyl propionate, vinyl butyrate, and mixtures thereof. Minor amounts, e.g. up to about 10 percent by weight, of polymerized monomers other than ethylene and the vinyl ester moiety may be included in the interpolymer component of the gel composition. Interpolymers preferred herein are copolymers of ethylene and vinyl acetate.

Although there is no known limitation on the molecular weight of the interpolymer, a melt index from about 2 to about 30 decigrams per minute is preferred. Melt indices set forth herein are determined as described in ASTM-D-1238-56T, Condition E. In general, the softening point of the interpolymer component may be from about 150° F to about 400° F, and preferably from about 180° F to about 300° F, as determined by well known ring and ball procedures. In general, the ethylene/vinyl ester interpolymer may include from about 15 to about 50 and preferably from about 20 to about 40 percent by weight of the vinyl ester moiety.

The ethylene/vinyl ester interpolymer component may be included in an amount of from about 20 to about 60 parts by weight per 100 parts by total weight of the saturated acid component, the interpolymer component and the tackifying resin component, and preferably from about 30 to about 50 parts by weight on the same basis.

In gel compositions including an ethylene/vinyl acetate copolymer as the ethylene/vinyl ester interpolymer component, the copolymer may include from about 50 to about 85 and preferably from about 60 to about 80 percent by weight of ethylene and from about 15 to about 50 and preferably from about 20 to about 40 percent by weight of vinyl acetate. The average molecular weight of the ethylene/vinyl acetate copolymer may be such as to provide a melt index of from about 2 to about 75 and preferably from about 2 to about 30 decigrams per minute. Especially suitable herein are ethylene/vinyl acetate copolymers having a softening point of from about 180° F to about 300° F, as measured by ring and ball procedures. Mixtures of two or more ethylene/vinyl ester copolymers are also within the scope of this invention. Ethylene/vinyl acetate interpolymers suitable for use herein may be prepared using the methods disclosed in U.S. Pat. No. 2,200,429 and U.S. Pat. No. 2,703,794.

The tackifying resin component may be any suitable tack producing resin or a mixture of such resins. Tackifying resins suitable herein include hydrocarbon resins, that is thermoplastic resins of low molecular weight made from relatively impure monomers consisting essentially of carbon and hydrogen atoms and derived from coal-tar fractions, cracked petroleum distillates, and turpentine, including for example, coumarone-indene resins, terpene resins, petroleum resins, and cyclopentadiene resins; vinyl copolymers, for example, a copolymer of preferably 35 to 85 percent vinyl toluene and preferably 15 to 65 percent α-methyl styrene; polyamides; synthetic rubber; and mixtures thereof. Terpene resins are described in U.S. Pat. No. 3,278,646 to Lambert, U.S. Pat. No. 3,277,040 to Barkis et al, and U.S. Pat. No. 3,253,059 to Vollmer, the disclosures of which in pertinent part are incorporated herein by reference. In general, tackifying resins preferred herein include the hydrocarbon resins and copolymer resins of vinyl toluene polymerized with α-methyl styrene. Especially good results have been observed using one or more terpene resins, coumarone-indene resins, and/or vinyl toluene/α-methyl styrene copolymers as the tackifying resin component.

The tackifying resin component may be included in an amount from about 5 to about 40, and preferably from about 10 to about 30, parts per weight per 100 parts by total weight of the saturated aliphatic monocarboxylic acid component, the ethylene/vinyl ester interpolymer component and the tackifying resin component.

The organic solvent component may be almost any organic solvent or mixture of such solvents which is effective for uniformly dispersing the other components substantially throughout and is normally liquid, that is a solvent which is liquid at temperatures at which the gel composition is prepared and employed. In general, the boiling point of the organic solvent component is 250° F or less at a pressure of 760 millimeters of mercury, absolute. Suitable organic solvents include the lower alkanols, e.g., up to 8 carbon atoms such as methanol, ethanol, n-propanol, isopropanol, and lower alkyl acetates, e.g., up to 9 carbon atoms such as ethyl acetate, hexyl acetate and methyl acetate, and the like.

Suitable hydrocarbon solvents include straight and branched chain alkanes, cycloalkanes, aromatics of the benzene series, such as toluene, xylene, and mixtures thereof. Especially suitable solvents include naphtha, n-hexane, and mixtures thereof. The organic solvent may be included in any suitable amount. Typically, the solvent is present in an amount effective for dispersing the other components substantially uniformly throughout. In general, the solvent is included in an amount from about 50 to about 85 parts by weight per 100 parts by total weight of the monocarboxylic acid component, the ethylene/vinyl ester interpolymer component and the tackifying resin component. However, amounts of solvent without the indicated range may prove useful in some applications.

The present gel composition typically exhibits excellent flow out properties which aid in improving the heat seal characteristics of substrates coated with the composition. Persons having ordinary skill in the art and the benefit of this disclosure will be able to formulate particular gel compositions within the scope of this invention for a variety of heat sealing applications, with not more than minimal experimentation.

A gel composition which may be found suitable for a variety of heat sealing applications is a liquid mixture including (a) from about 5 to about 40, preferably from about 10 to about 30 parts of stearic acid; (b) from about 20 to about 60, preferably from about 30 to about 50 parts of an ethylene/vinyl acetate copolymer including from about 20 to about 40 percent ethylene units and about 60 to about 80 percent vinyl acetate units and having a melt index from about 2 to about 30, preferably about 5 to about 10 decigrams per minute; (c) from about 5 to about 40, preferably about 20 parts vinyl toluene/α-methyl styrene copolymer or coumarone-indene resin; and from about 50 to about 85 parts by weight of a mixture of V. M. & P. naphtha with n-hexane wherein the weight ratio is from about 0.3:1 to about 3:1, and preferably about 1:1 part of naptha: part of n-hexane. This liquid gel composition, which will be referred to hereinafter as Composition I, typically exhibits especially good flow out properties.

The present gel compositions may be prepared using well known blending procedures. For example, the various components may be added to a vessel and stirred to provide a uniformly mixed liquid composition.

If desired conventional additives may be incorporated into the present gel composition to modify certain properties of films cast therefrom. Suitable additives include diluents such as liquid polypropylene having a molecular weight in the range of 700 to 1,200; polyethylene greases; hydrogenated animal, fish and vegetable fats; and mineral oil; stabilizers and antioxidants such as hydroxytoluene, high molecular weight phenols and substituted phosphites; and colorants such as titanium dioxide and watchung red. Minor quantities of isotactic polypropylene may be added in order to vary the flexibility characteristics of the adhesive films cast from the gel composition. Plasticizers such as phthalate esters, phosphate esters, chlorinated biphenols, etc. may likewise be incorporated to vary the flexibility of the films derived therefrom. The total concentration of these optional additives generally should not exceed about 15 weight percent based on the total combined weight of the monocarboxylic acid component, the ethylene/vinyl ester interpolymer component and the tackifying resin component. The optional additives may be added during the mixing or dissolving operation utilized for the preparation of the gel composition of this invention.

Fillers, such as are commonly employed as loading agents in adhesives, may also be added to the present gel composition. Examples of such fillers include clay, talc, silica, calcium carbonate, and the like. The filler can be added at any time during the preparation of the gel composition, and mixtures of two or more fillers may also be used. The concentration of filler generally should not exceed about 30 weight percent, based on the total combined weight of the monocarboxylic acid component, the ethylene/vinyl ester component, and the tackifying resin component.

Although wax is not required in the present gel composition, paraffin wax, microcrystalline wax, and the like may be included. In applications where a very low sealing temperature is desired, the gel composition is preferably at least substantially free of wax, that is, wax is preferably not present in an amount of about one percent or more, preferably not more than 0.5 percent by weight, based on the total combined weight of the monocarboxylic acid component, the ethylene/vinyl ester interpolymer component, and the tackifying resin component. Generally, inclusion of wax in higher amounts, for example 5 to 20 percent or more results in intermediate or higher activation temperatures for heat sealing.

In heat sealing use, the gel composition or adhesive lacquer of this invention may be applied by means of any suitable coating technique. Thus, the lacquer may be applied by any suitable coating process such as air knife, training blade, knife coater, reverse roll or gravure coating technique. Subsequent to its application the solvent is removed from the resulting adhesive film by means of drying, as for example with forced air which may be either slightly heated or at room temperature. In drying, an effective amount of the organic solvent is removed from the applied gel composition to form a substantially dry gel coating or film. Desirably, the adhesive lacquer is applied in an amount effective to yield a coating weight, dry basis, in the range of from about 0.5 to about 5 pounds and preferably from about 1 to about 3 pounds per 300 square feet of substrate.

When the gel coatings derived from the present gel composition are activated by heating to a temperature above about 110° F, e.g. about 120° F, the coatings become tacky and capable of forming strong adhesive bonds with a wide variety of materials. After the gel coating is formed a second surface may be heat sealed to the gel coating surface using any suitable heat sealing method. Such methods are well known in the art. A suitable sealing method includes interfacially engaging the surface of the gel coating with a second surface and heating the interface of the engaged surfaces to at least the activation temperature of the coated gel composition. Engagement of the surfaces to be sealed may be effected by means of application of slight pressure. The heating and surface engaging may be effected in any sequence, including simultaneous heating and engagement. Although the coated gel surface may be heated to the activation temperature and thereafter engaged with a surface to be adhered thereto, engagement of the surfaces is preferably effected prior to heat activation of the gel coating.

It is an important advantage of this invention that excellent heat seals can be formed at a sealing temperature of not more than 130° F, while strong seals can be formed at a sealing temperature of not more than 120° F. Higher temperatures are suitable.

Although there are no known limitations on materials to which the present gel composition may be applied, polyolefinic sheet material especially benefits from this invention. In general polyolefins are heat degradable at higher temperatures not required for heat sealing using the present gel compositions, which provide gel coatings having low activation temperature. In contrast to many prior art heat sealing methods, the present invention provides means for heat sealing polyolefin sheets, films, and other suitable substrates to other surfaces of the same or different composition without requiring heating the polyolefin to molten condition.

Polyolefins which may be coated and heat sealed using the present gel composition and process include homopolymers or copolymers of two or more olefins such as ethylene, propylene, 1-butylene, 2-butene, 1-pentene, 4-methyl-1-pentene, 3-methyl-1-butene, 3,3,-dimethyl-1-butene, and the like, polymerized by any suitable procedure. Mixtures of the foregoing polyolefin polymers may be suitably used. The polyolefins may include a variety of additives, for example, stabilizers, slip agents, pigments, anti-static agents, anti-blocking agents, anti-fog agents, dyes, and the like.

Sheets, films and other articles of high density polyethylene, cross-linked or not, which typically heretofore have been heat sealed only with great difficulty may be heat sealed using the present gel composition and process with improved ease. Although not required the polyethylene or other polyolefin to be coated may be corona treated, flame treated, or otherwise treated to improve coating receptivity.

In a commercially attractive embodiment of this invention, polyolefinic sheet material having the present gel coating on a surface thereof is heat sealed to a vinylidene chloride interpolymer containing surface which may be included as part of the polyolefin sheet material. Suitable vinylidene chloride interpolymers include polymers of vinylidene chloride with one or more vinyl monomers copolymerizable therewith, including for example, vinyl chloride, acrylonitrile, and methyl acrylate. Preferred vinylidene interpolymers include copolymers of vinylidene chloride with vinyl chloride, preferably saran, that is, a copolymer having a ratio of parts by weight of vinylidene chloride: parts by weight of vinyl chloride of from about 80:20 to about 90:10. The present process thus provides an improvement adapted for ue in packaging on high speed form and fill production lines wherein film laminates of polyethylene, polypropylene or other polyolefinic compositions are bonded along a seam provided by overlapping portions of the polyolefinic surface with a saran surface which may be provided by a saran layer coated on the polyolefin or otherwise by included as an outer layer of the laminate. Composition I set forth above is highly attractive in this embodiment. A preferred polyolefin film is high density polyethylene having density from about 0.94 to about 0.96 grams per cubic centimeter. Polyethylene film surfaces have been effectively bonded to surfaces of saran in high speed form and fill packaging operations using the present process with the following heat seal conditions wherein amounts are shown in parentheses: sealing temperture (120° F and lower), dwell time (2 seconds and lower), and sealing pressure (10 pounds per square inch).

Still other materials to which the gel composition may be applied with highly suitable results in subsequent heat sealing are cellulosic sheet materials including paper, paperboard, cellophane and the like. Glassine sheets and films are preferred. Highly suitable seals have been provided between glassine layers and saran layers using the present gel composition as a sealing aid. Glassine is a thin transparent paper which may be and preferably is treated with or admixed with urea-formaldehyde resin and finds use in packaging applications such as packaging of potato chips in form and fill processes.

Rolls of glassine film coated on one side with saran and on the opposite side with substantially dry coatings of the present gel composition have been found to effectively resist blocking to commercially attractive extent. When formed into a tubular shape with gel coating surfces superposed on saran surfaces, effective seals therebetween of suitable strength have been provided by way of heating the seam provided by the superposed surfaces to temperatures of about 180° F and lower.

Practice of the present invention is further illustrated by the examples which follow. All parts and percentages given throughout this specification are by weight unless otherwise indicated.

EXAMPLE 1

The following ingredients were mixed in the indicated amounts: about 40 parts of stearic acid, about 40 parts of Elvax Vinyl Resin 260 (a trademarked product by Du Pont Co. consisting essentially of a copolymer of about 72 percent ethylene and about 28 percent vinyl/acetate having a tensile strength of about 2,900 p.s.i. and a softening point by ring and ball of about 310° F), about 20 parts of Piccotex 120 (trademark for a vinyl toluene/α-methyl styrene copolymer resin by Pennsylvania Industrial Chemical Corp.) and about 650 to 680 parts of a liquid blend of approximately equal parts of V. M. & P. naptha and n-hexane. Mixing was continued at a temperature of about 70°to 80° F for a brief period during which time the stearic acid, Elvax 260 and Piccotex 120 were dispersed uniformly throughout the liquid blend. Using a no. 8 Mayer bar the resulting gel composition was coated onto one surface of a flexible layer of corona-treated polyethylene film, 2.5 mils in thickness, having high density of from about 0.94 to about 0.96 gram per cubic centimeter.

The gel coated film was dried in air at 100°–120° F for a brief period, after which the resulting dried gel coating was found to be strongly adhered to the polyethylene. When taken up on a roller, the gel coated film was found to effectively resist blocking for prolonged periods of storage at temperatures as high as 120° F.

Portions of the gel coated film were rolled and two opposite marginal surfaces were superposed into interfacial relation with a gel coated surface adjacent an uncoated polyethylene surface. The superposed surfaces were heat sealed using a Sentinel bar sealer having a first jaw of metal and an opposing jaw of rubber. The sealer was operated using well known procedures therefor. The metal jaw was heated to 130° F and clamped to the rubber jaw with the film margins therebetween using an applied pressure of 20 pounds per square inch. After a dwell period of 2 seconds, the jaws were removed and the film was cooled with ambient air. Observations showed that the gel coating was effectively retained on the surface initially coated therewith and formed a highly suitable bond with the superposed film surface portion.

Seal strength of the coated to uncoated surface was 92 grams per inch, as determined by an Instron tensile tester using a crosshead travel rate of 12 inches per minute and a chart speed of 2 inches per minute. The heat seal strength was measured as the static force required to initiate bond peeling.

EXAMPLES 2 TO 7

The procedure of Example 1 was repeated using jaw temperatures of 110° to 200° F. With the exception of the failure to seal at 110° F, the results were substantially the same, with the further exception that the strengths of the seals were found to be as follows:

| Seal Bar Temperature | | Seal Strength |
|---|---|---|
| Example No. | (° F) | (grams per inch) |
| 2 | 110 | (no seal) |
| 3 | 120 | 38 |
| 4 | 140 | 82 |
| 5 | 160 | 74 |
| 6 | 180 | 94 |
| 7 | 200 | 110 |

EXAMPLES 8 TO 14

Examples 1 to 7 were repeated except that all the Piccotex 120 was replaced with 20 parts of Nenex 100 (trademark for a coumarone-indene resin product by Neville Chemical Co.). The results of seal strength tests for the resulting seals are shown below:

| Seal Bar Temperature | | Seal strength |
|---|---|---|
| Example No. | (° F) | (grams per inch) |
| 8 | 110 | (no seal) |
| 9 | 120 | 220 |
| 10 | 130 | 312 |
| 11 | 140 | 312 |
| 12 | 160 | 322 |
| 13 | 180 | 408 |
| 14 | 200 | 408 |

EXAMPLES 15 TO 19

Examples 1 to 5 were repeated except that the stearic acid was entirely replaced with 40 parts of Sunoco 4312 Paraffin wax. No satisfactory seals were formed in attempted sealing at temperatures below 150° F. No seal resulted at 110° F or 120° F and seals of too low a strength for measurement resulted at 130° F and 140° F.

EXAMPLES 20 TO 27

The procedures of Examples 1 to 8 were again repeated except that one surface of the polyethylene film was initially provided with a saran coating using well known techniques therefore. The areas in which sealing was attempted were provided by superposing portions of the saran surface on portions of the gel coated polyethylene surface. The results were substantially the same.

EXAMPLES 28 TO 35

Examples 1 to 8 were again repeated except the polyethylene film was replaced with glassine film, 2 mils in thickness. The results were substantially the same.

EXAMPLES 36 TO 43

Examples 28 to 35 were repeated except that the glassine film was initially provided with a saran coating using well known techniques therefor. The areas in which sealing was attempted were provided by superposing portions of the saran surface on portions of the gel coated glassine surface. The results were substantially the same.

Saran is a higher melting point material which oftentimes does not heat seal readily and frequently is thermally sensitive. Thus, the above examples wherein saran is effectively heat sealed to polyethylene or glassine at lower temperatures, e.g., 120° F to 180° F, illustrate a substantial advance in the art provided by this invention.

As used herein the term "polyolefin" includes polyethylene, polypropylene, resinous polymers of ethylene and propylene, polymers of ethylene and/or propylene with minor proportions of olefinically unsaturated monomers such as, for example, those α-olefins having from 2 to 8 carbon atoms such as 1-butene, 1-pentene, 1-hexane, 1-heptane, 1-octene and mixed higher α-olefins. Other hydrocarbons useful for making polymers with ethylene and propylene include divinylbenzene, allene, dimethallyl and isopentene. Comonomers which can be used include mono-substituted ethylenes such as 1-pentene, vinylcyclohexene, allyl benzene, $C_8$-$C_{14}$ mixed α-olefins, styrene, allyl naphthalene and the like, 1,1-disubstituted ethylenes such as α-methyl styrene, 2-methylbutene-1, mixed α- and α- pinenes, camphene and the like 1,2-disubstituted ethylenes such as indene, acenaphyhylene, cyclopentene, norbornylene, cyclohexene, trans-stilbene, 2-pentene and the like, conjugated dienes and trienes such as pentadiene-1,3,1,2-dihydrobenzene, allo-ocimene, and cyclopentadiene, unconjugated dienes such as mixed octadienes, hexadiene-1,5,2,5-dimethylhexadiene-1,5,1,4-dihydrobenzene, bicyclopentadiene, 4-vinylcyclohexene-1 and 4,7-diphenyl decadiene-1,9-acetylene such as isopropenyl acetylene and phenyl acetylene, chloro-olefins such as α-methallyl chloride and chloromethyl norbornylene, and m-chlorostyrene, ethers andd epoxides, esters such as vinyl butyrate, vinyl acetate and methyl acrylate, and nitrogen compounds such as vinyl carbazole, 4-vinyl pyridine and acrylonitrile and mixtures and blends thereof.

When used herein with reference to monocarboxylic acids, the term "saturated" means an acid having an iodine value of not more than 12. As used herein the term "stearic acid" includes stearic acid per se and mixtures thereof with minor amounts, for example up to about 20 percent, of other ingredients ordinarily present in a number of commercially available compositions nominally referred to in the art as stearic acid. These ingredients include, for example, palmitic acid, myristic acid, pentadecanoic acid, oleic acid and linoleic acid. For additional background description of stearic acid, see U.S. Pat. No. 3,479,309 to Hecker et al., which, in pertinent part, is incorporated herein by reference.

As used herein, the term "tackifying resin" means a resin which when included in the present gel composition cooperates with the other components to impart good hot tack properties, i.e. adhesive strength sufficient to substantially resist parting forces exerted on bonds formed between a substrate and the applied gel composition while the bonds are at elevated temperatures, e.g. 100° F or higher.

It is understood that the foregoing detailed description is given merely by way of illustration and that various modifications may be made therein without departing from the spirit or scope of the present invention.

What is claimed is:

1. A heat sealable article comprising a solid substrate selected from the group consisting of polyolefinic and cellulosic sheets having coated on at least one surface of the substrate a substantially dry residue of a substantially wax free gel composition adapted to contact another surface in heat sealing engagement, and wherein said gel consists essentially of:
    a. an aliphatic saturated monocarboxylic acid having from about 10 to about 24 carbon atoms;
    b. an interpolymer of ethylene and a vinyl ester of a monocarboxylic acid having from 1 to about 4 carbon atoms;
    c. a tackifying resin; and
    d. an organic solvent wherein, per 100 parts by total weight of said components (a), (b) and (c), the saturated carboxylic acid component is present in an amount from about 5 to about 40 parts by weight, the interpolymer component is present in an amount from about 20 to about 60 parts by weight, and the tackifying resin is present in an amount from about 5 to about 40 parts by weight wherein said interpolymer includes from about 15 to about 50 percent by weight of said vinyl ester.

2. The heat sealable article of claim 1 wherein the carboxylic acid has from 16 to 20 carbon atoms.

3. The heat sealable article of claim 1 wherein the acid is stearic acid.

4. The heat sealable article of claim 1 wherein the interpolymerized vinyl ester is vinyl acetate.

5. The heat sealable article of claim 1 wherein the tackifying resin is selected from the group consisting of hydrocarbon resins, copolymer resins of vinyl toluene copolymerized with α-methyl styrene, synthetic rubber, and polyamides.

6. The heat sealable article of claim 1 wherein the tackifying resin is selected from the group consisting of coumarone-indene hydrocarbon resins, terpene hydrocarbon resins, and copolymer resins of vinyl toluene and α-methyl styrene.

7. The heat sealable article of claim 1 wherein said saturated carboxylic acid is stearic acid; said interpolymerized vinyl ester is vinyl acetate; and tackifying resin is selected from the group consisting of coumarone-indene resin, terpene resins, copolymer resins of vinyl toluene and α-methyl styrene, and mixtures of said resins.

8. The coated substrate of claim 1 wherein the substrate is a polyolefinic sheet material, said residue being disposed on an outer surface thereof.

9. The coated substrate of claim 8 wherein said first outer layer is of polyethylene.

10. The coated substrate of claim 8 wherein said first outer layer is of polypropylene.

11. The coated substrate of claim 8 further including an outer layer of a vinylidene chloride interpolymer on a surface of said substrate opposite said outer surface 12. The coated substrate of claim 11 wherein the first outer layer is of polyethylene having a density from about 0.94 to about 0.96 gram per cubic centimeter and the vinylidene chloride interpolymer is a copolymer of (a) from about 80 to about 90 parts by weight of vinylidene chloride units and (b) from about 20 to about 10 parts by weight of vinyl chloride units.

13. The coated substrate of claim 1 wherein the substrate is a flexible sheet having an outer layer of a cellulosic sheet material, said residue being disposed on an outer surface thereof.

14. The coated substrate of claim 13 wherein said first outer layer is of glassine.

15. The coated substrate of claim 13 further including an outer layer of a vinylidene chloride interpolymer on a surface of said substrate opposite said outer surface.

16. The coated substrate of claim 15 wherein the first outer layer is of glassine and the vinylidene chloride interpolymer is a copolymer of (a) from about 80 to about 90 parts by weight of vinylidene chloride and (b) about 20 at to about 10 parts by weight of vinyl chloride.

* * * * *

UNITED STATES PATENT OFFICE
CERTIFICATE OF CORRECTION

Patent No. 4,020,228          Dated May 16, 1977

Inventor(s) Frank E. Eastes

It is certified that error appears in the above-identified patent and that said Letters Patent are hereby corrected as shown below:

Column 12, claim 7, line 24, delete [and] and insert ---said---.

Column 12, claim 16, line 61, delete [at].

Signed and Sealed this twenty-sixth Day of July 1977

[SEAL]

Attest:

RUTH C. MASON
Attesting Officer

C. MARSHALL DANN
Commissioner of Patents and Trademarks